Nov. 29, 1927.  
W. J. McKEE  
1,650,845  
DISPLAY CABINET  
Filed Dec. 14, 1925   6 Sheets-Sheet 1

INVENTOR.  
WILLIAM J. McKEE  
BY  
Rex Frye.  
ATTORNEY.

Nov. 29, 1927.

W. J. McKEE

DISPLAY CABINET

Filed Dec. 14, 1925

INVENTOR.
WILLIAM J. McKEE
BY
Rex Frye.
ATTORNEY.

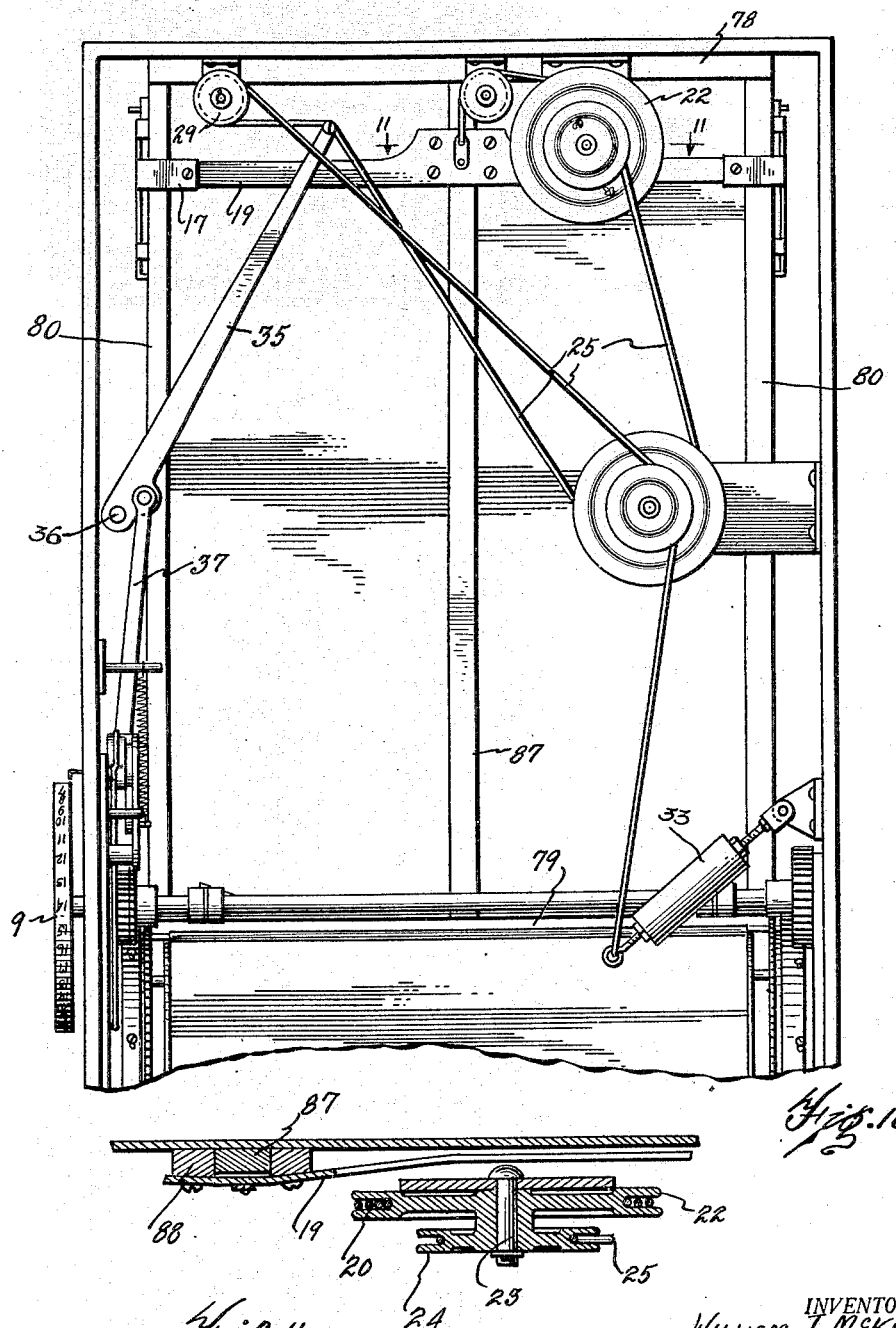

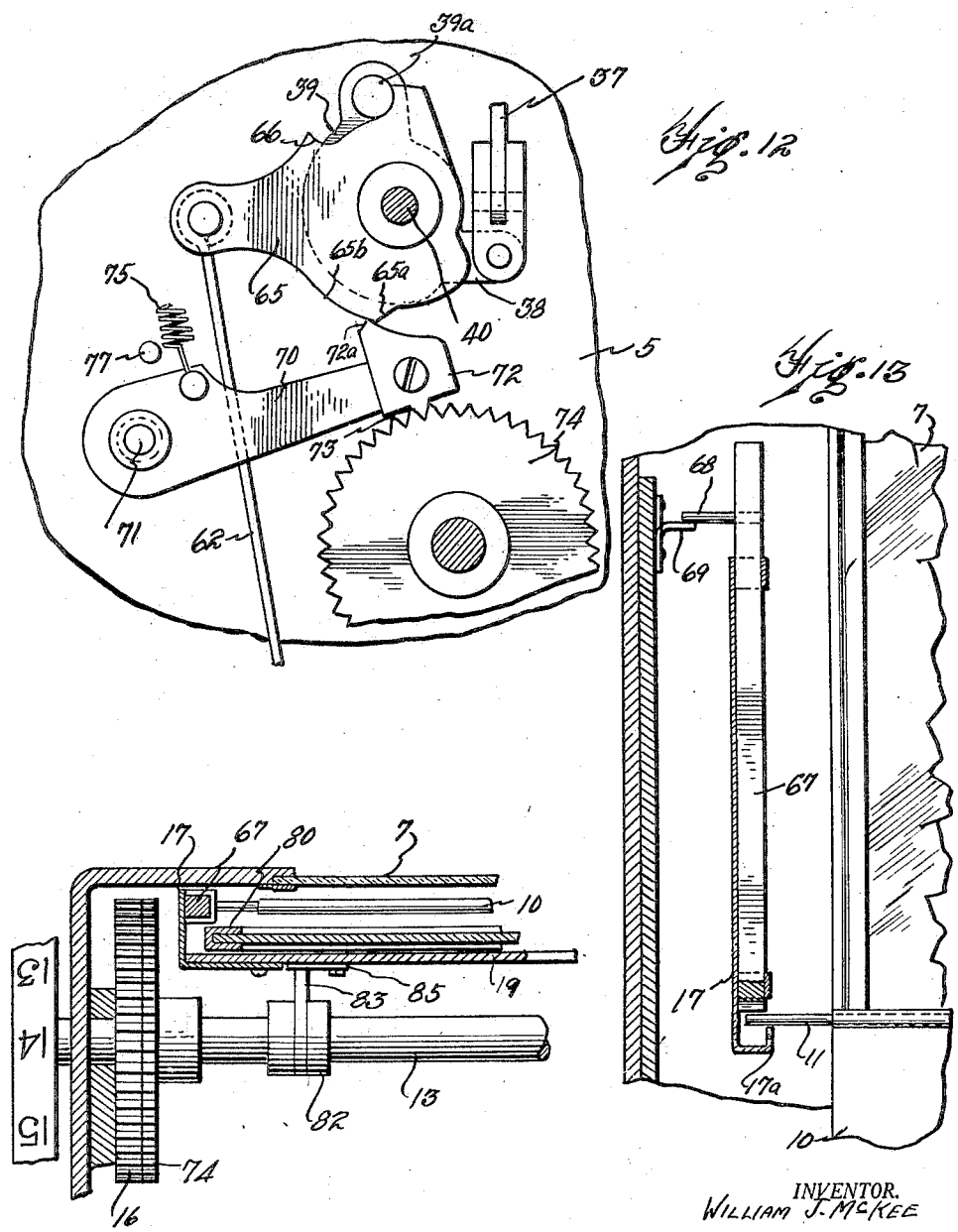

Patented Nov. 29, 1927.

1,650,845

UNITED STATES PATENT OFFICE.

WILLIAM J. McKEE, OF DETROIT, MICHIGAN.

DISPLAY CABINET.

Application filed December 14, 1925. Serial No. 75,180.

This invention relates to display cabinets, and more particularly to means for displaying at will any one of a series of placards bearing advertising or directive indicia thereon and which are ordinarily maintained out of sight in a suitable container.

The principal object of my invention is the provision of a display cabinet wherein are housed advertising or directive sheets in position to be quickly selected and moved to display position by simple and positive mechanism certain to be correctly operated by even an inexperienced person.

Another object of the invention is the arrangement of a series of display sheets in compact alignment upon a serrated segment adapted to be oscillated at will by the operator to bring any desired sheet into position above the contact member of a lifting and lowering mechanism whereby that particular sheet may be quickly elevated to display position, maintained there as long as desired, and then automatically lowered into its original position upon the supporting segment.

A further object of the invention is the mounting of locking mechanism intermediate the lifting mechanism and the selecting mechanism whereby the supporting segment is locked prior to the lifting of any sheet therefrom and held in locked position until the sheet is returned to its original position.

Other objects and advantages will be apparent from the following description, wherein reference is made to the accompanying drawings illustrating a preferred embodiment of my invention and wherein similar reference numerals designate similar parts throughout the several views.

In the drawings:

Fig. 6 is a detail section through the mechanism for locking the selecting mechanism during the operation of the lifting and lowering mechanism and associated parts taken substantially on the line 6—6 of Fig. 3.

Fig. 7 is a detail perspective view of the upper contact finger for engaging the display sheet during the lifting and lowering operation.

Fig. 8 is a similar view of the lower contact member.

Fig. 9 is a detail perspective view showing the means for positively bracing the lower portion of the display guide rack while maintaining a clear path for the travel of any display sheet.

Fig. 10 is a view similar to Fig. 2 with the lifting mechanism in its extreme upper position.

Fig. 11 is a detail section taken substantially on the line 11—11 of Fig. 10.

Fig. 12 is an enlarged detail view of the means for locking the selecting mechanism while the lifting and lowering mechanism is being operated.

Fig. 13 is a detail view taken substantially on the line 13—13 of Fig. 4, and

Fig. 14 is a detail sectional view taken substantially on the line 14—14 of Fig. 6.

Figure 1:
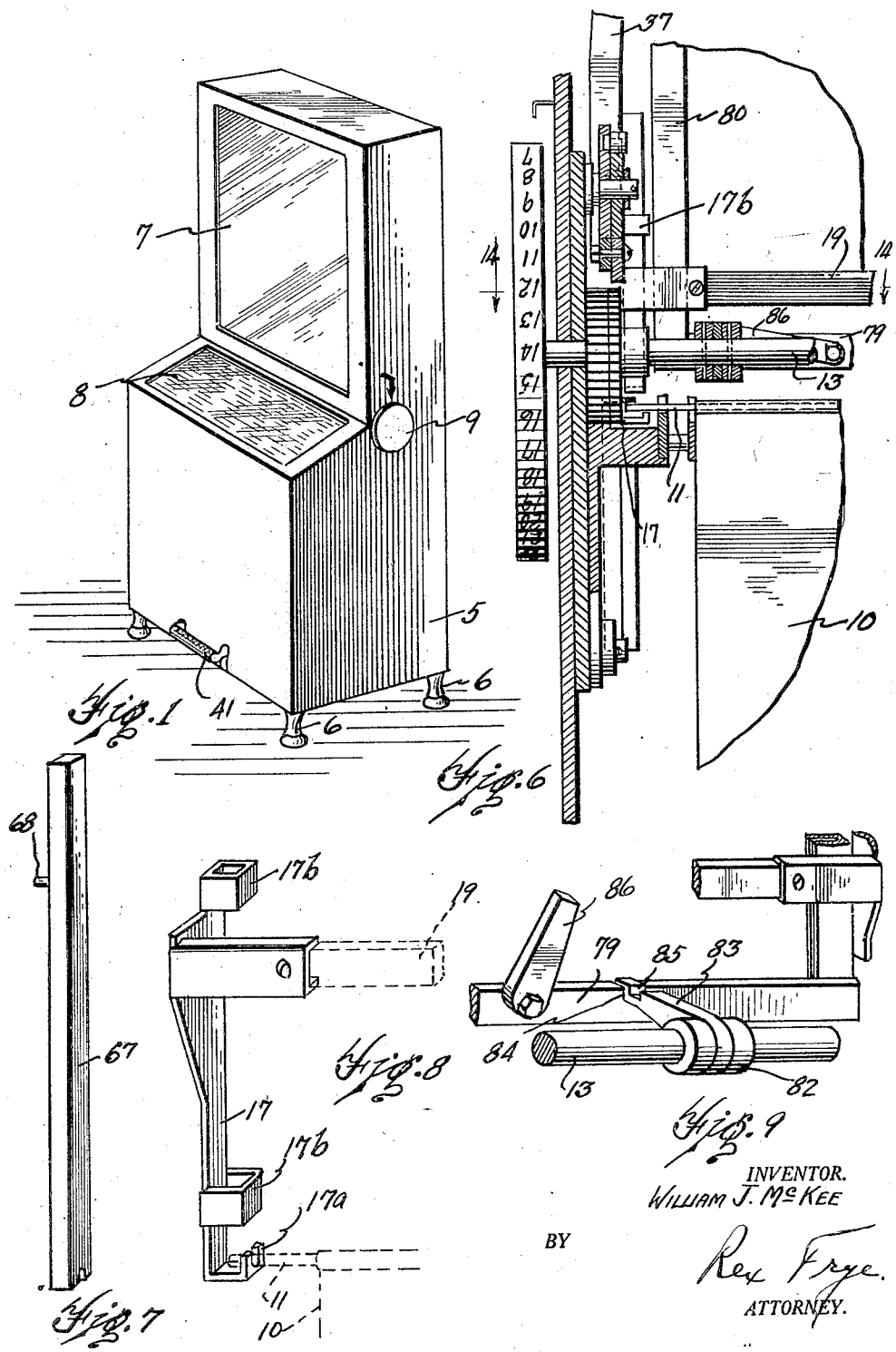
Fig. 1 is a perspective view of a display cabinet constructed in accordance with my invention.

Referring now to the drawings, the numeral 5 designates the cabinet, which as best shown in Fig. 1, is constructed with a comparatively shallow upper portion and a deeper lower portion, the lower portion being utilized for housing the series of display sheets and the mechanism for supporting same, while the shallow upper portion is utilized mainly for exhibiting one of the display sheets which has been selected by the operator for such display. The cabinet 5 may be formed of wood, sheet metal or the like, and is preferably supported upon legs 6 to enhance its appearance and provide access for cleaning below the cabinet. Any preferred design of cabinet may be employed. The front panel of the upper portion of the cabinet is formed mainly of a large sheet 7 of glass or other transparent material through which any selected display sheet can be readily seen by persons standing in front of the cabinet. The shelf-like projection at the top of the wider portion of the lower cabinet section is utilized for displaying an index of the various advertisements, schedules or classifications that are contained upon the concealed display sheets, so that a person desiring to look up any desired classification of businesses, for example, may readily pick out from the index 8 the particular sheet bearing such information. As herein illustrated, each sheet is numbered, and the reference to it on the index 8 would be to the number of the sheet, and then the selecting mechanism may be readily operated to bring the desired sheet into proper position for display by rotating a handwheel 9, bearing on its periphery numbers corresponding to the numbers of the display sheets, until the desired number is opposite a pointer or other determinative mark on the cabinet wall.

Figure 2:
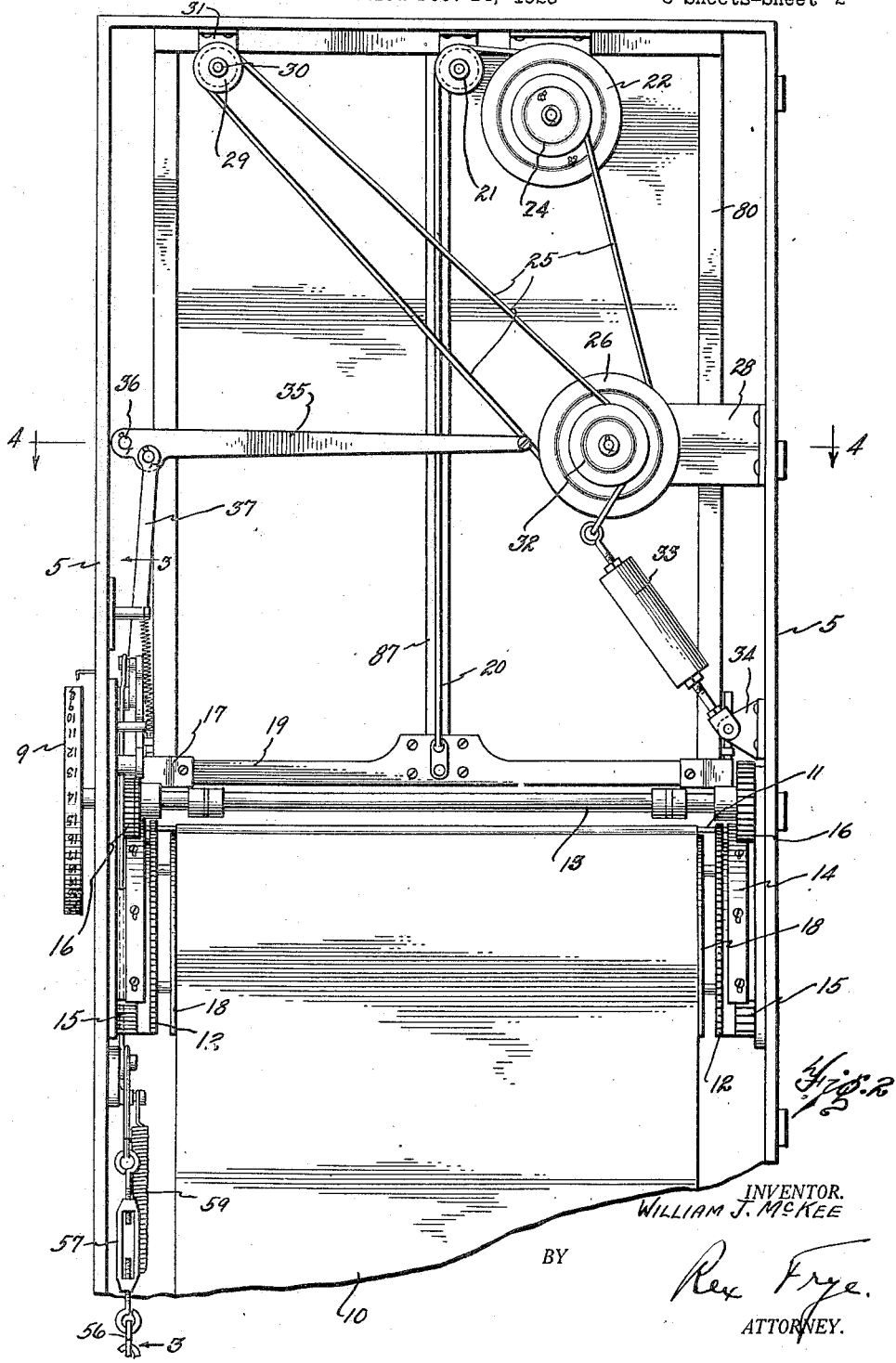
Fig. 2 is a rear elevation of the upper portion of the display cabinet, the rear wall being removed to disclose the interior mechanism.
Figure 3:
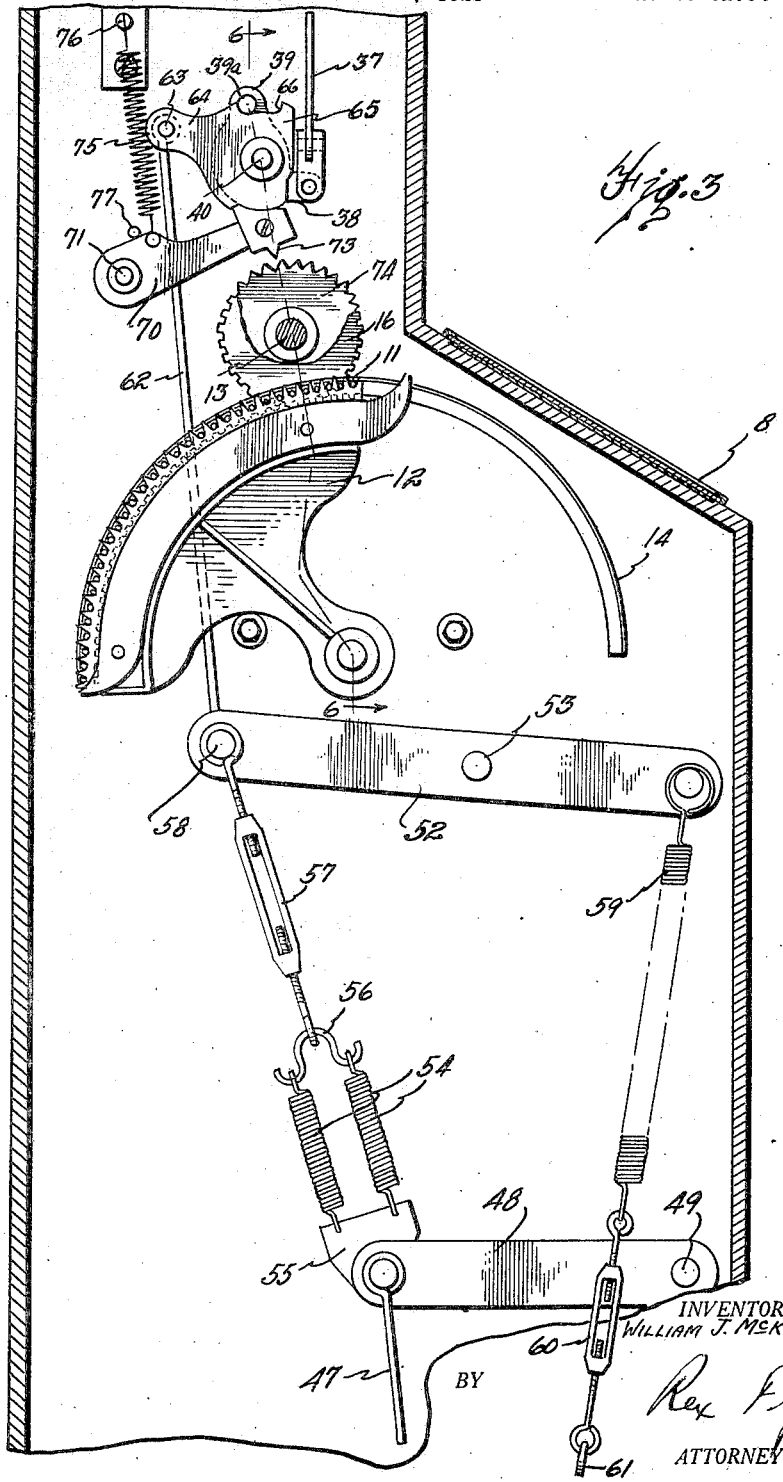
Fig. 3 is an enlarged detail vertical section taken substantially on the line 3—3 of Fig. 2.

The mechanism for supporting the series of display sheets and selecting any one of such sheets for exhibition purposes will now be described. As best illustrated in Figs. 2 and 3, a plurality of display sheets 10 are suspended by means of cross bars 11 from a pair of serrated segments 12 mounted adjacent the opposite extremities of the shaft 13 journaled in suitable bearings carried by the side walls of the cabinet. The cross bars 11 extend into parallel notches in the segments 12 and are spaced from each other by the distance of the teeth between such notches. Accordingly by varying the number of notches on the segments 12, I am enabled to support as many display sheets 10 as may be needed for chronicling the various classified industries of any town or city, for example, and at the same time maintain such display sheets in parallel spaced relation regardless of the position of the supporting segments. To prevent accidental dislocation of the cross bars 11 from the serrations of the segments 12 I preferably provide guard strips 14 adjacent the opposite extremities of the path of travel of the segments in position to cover the extremities of the cross bars 11 where they extend beyond the serrations of the segment at all places except where the cross bars are in alignment with the pick-up members of the lifting and lowering mechanism hereinafter described. The segments 12 carry on their outer sides curved racks 15 adapted to mesh with pinions 16 fixed upon the shaft 13. One extremity of the shaft 13 extends through the side wall of the cabinet 5 and carries the handwheel 9. Whenever the handwheel 9 is turned by the operator to bring any desired number into alignment with the pointer the shaft 13 and pinions 16 are also rotated to swing the segments 12 and, accordingly, change the positions of the display sheets supported thereon, bringing the cross bar 11 of each display sheet successively over the pick-up member 17 of the lifting and lowering mechanism. To prevent sidewise movement of the display sheets while supported on the segments 12 I preferably provide inwardly extending guide members 18 on the segments in position to be contacted by the edges of the display sheets whenever they shift their positions laterally (note Fig. 2).

The operation of the supporting and selecting mechanism is believed to be apparent. The various display sheets 10 are placed with their cross bars 11 in the proper serrations so that the sheet numbered to correspond with the number on the periphery of the handwheel 9 will be directly over the pick-up member 17 whenever the number on the handwheel is aligned with the pointer. Then the guard strips 14 are positioned to prevent accidental dislocation of the display sheets. Thereupon the segments 12 and display sheets are moved above the pick-up members 17 in accordance with the rotation of the handwheel 9. When the desired sheet has been brought into the position desired above the pick-up members 17, the lifting and lowering mechanism is operated to elevate the selected sheet into display position directly behind the glass panel 7 of the cabinet.

Figure 4:
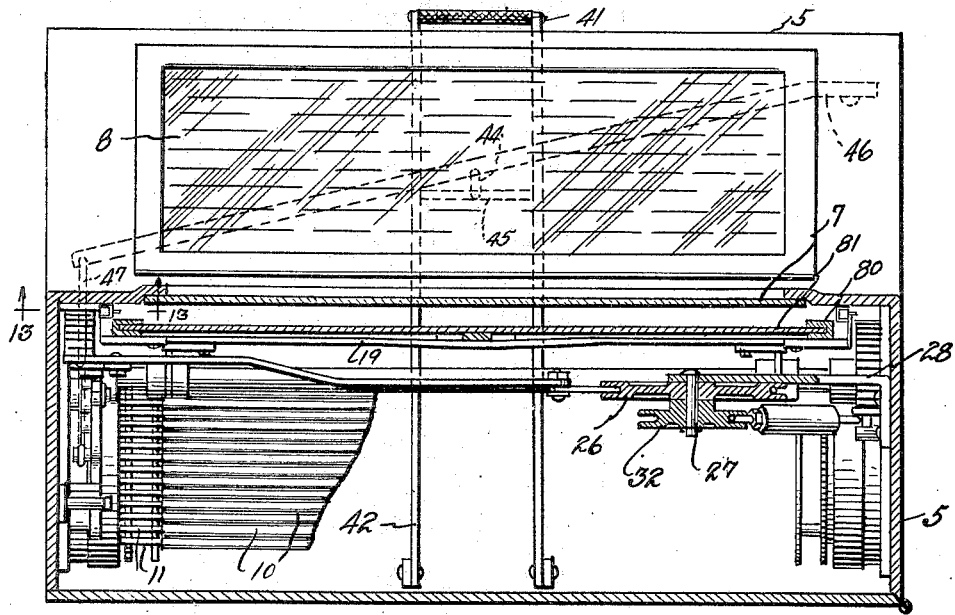
Fig. 4 is a cross section taken substantially on the line 4—4 of Fig. 2.
Figure 5:
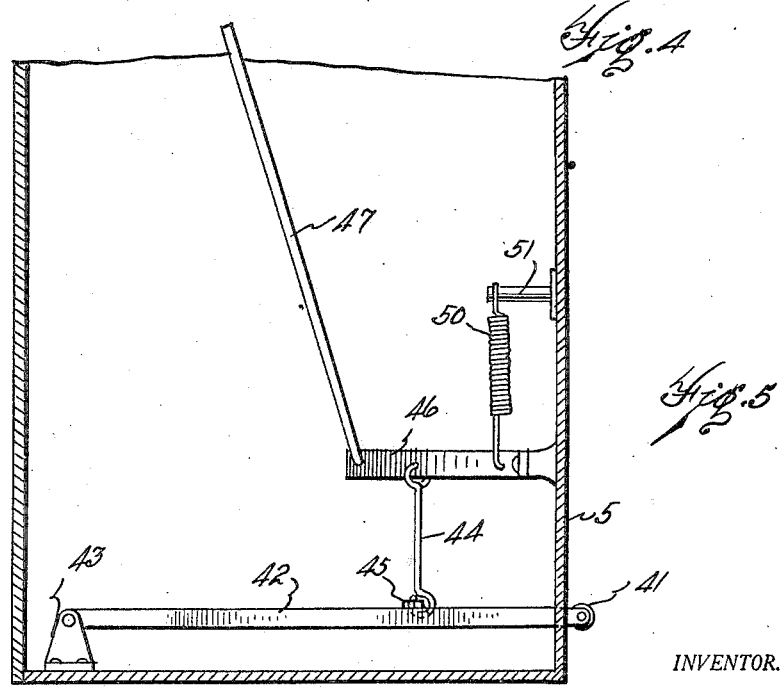
Fig. 5 is a detail vertical section through the lower portion of the display cabinet.

The lifting and lowering mechanism will now be described. Each pick-up member 17 is formed with a notched base 17ª adapted to engage the cross bars 11 of the display sheets (see Fig. 8) whenever the pick-up members are elevated from their normal position. The two pick-up members are secured at opposite extremities of a lifted bar 19 which is connected at its central portion to the lifting cord 20 extending vertically upward centrally of the cabinet and passing over an idler pulley 21 and is wound upon the larger pulley 22 of the double pulley member journaled on the stub shaft 23 adjacent the top of the cabinet (see Figs. 10 and 11). To the smaller pulley 24 of this double pulley is secured one extremity of an operating cord 25 adapted to be wound several times around the pulley 24 when the lifter bar 19 is in its normal lowered position and which is unwound from the pulley 24 while the lifting cord 20 is being wound upon the pulley 22 during the elevation of the lifter bar 19. The operating cord 25 passes from the pulley 22 around a large idler 26 mounted on a stub shaft 27 secured in the bracket 28 supported from the side wall of the cabinet (see Figs. 2 and 4), thence to the idler pulley 29 journaled on the stub shaft 30 in the bracket 31 depending from the top of the cabinet, and thence to the small idler 32 secured on the same stub shaft 27 as the large idler 26, the lower end of the cord 25 being secured to the free end of a weighted lever 33, the opposite end of which is pivoted upon the bracket 34 carried by the side wall of the cabinet. As the operating cord 25 unwinds from the smaller portion 24 of the pulley 22 the lever 33 falls and takes up the slack, maintaining the cord taut in its passage over the idler pulleys 26, 29 and 32. Then as the lifter bar 19 is again lowered the operating cord 25 is rewound upon the smaller portion 24 of the pulley 22 and the lever 33 is lifted to its raised position, as shown in Fig. 2. To move the operating cord 25 sufficiently to elevate the lifter bar 19, I provide an operating lever 35 pivoted at one end upon the stub shaft 36 adjacent one side of the cabinet and connected at its opposite extremity to the operating cord 25, substantially as shown in Fig. 2. This connection is made to the cord 25 so that the operating lever 35 is substantially horizontal when the lifter bar 19 is in its normal lowermost position, and then as the operating lever is rocked the portion of the cord 25 normally adjacent the large idler 26 is moved upwardly toward the idler pulley 29, until when the lifter bar 19 is in its uppermost position the lever 35 has reached substantially the position shown in Fig. 10. By properly varying the length of the operating lever 35 and computing the actual travel needed by the operating cord, any desired extent of elevation for the lifter bar 19 can be secured. The rocking of the operating lever 35 is secured by means of a vertically moving link 37 pivoted at its upper extremity to the lever 35 adjacent its fulcrum and pivoted at its lower extremity to the arm 38 extending from the bell-crank-lever 39 pivoted upon the stub shaft 40 fixed upon the side wall of the cabinet (see Figs. 3 and 12). As herein illustrated I have shown a foot lever means for rocking the bell-crank-lever 39 whenever desired. The pedal 41 extends through the front wall of the cabinet substantially as shown in Figs. 1 and 5 for engagement by the foot of the operator, and is carried at the forward extremity of a pair of links 42 pivoted at their rear extremities upon brackets 43 fixed upon the floor board of the cabinet. A link 44 connects a cross bar 45 of the foot lever with the multiplying lever 46, which, as best shown in Fig. 4, is pivoted adjacent one side of the cabinet and extends diagonally across to the opposite side of the cabinet, its free end being secured to a link 47 extending upwardly into engagement with the short intermediate lever 48, pivoted upon a stub shaft 49 (note Fig. 3). A spring 50 is arranged between the multiplying lever 46 and a pin 51 secured upon the front wall of the cabinet so as to hold the foot treadle mechanism normally in raised position. I also provide a shock absorbing mechanism between the intermediate lever 48 and rocker-bar 52 pivoted intermediate its ends on the stub shaft 53 extending from the side wall of the cabinet to prevent the transmission to the lifter bar and associated mechanism shocks imposed by too vigorous depression of the foot treadle. As herein shown, this shock absorbing mechanism comprises a pair of springs 54 mounted at their lower extremities upon a bracket 55 pivoted upon a pin carried at the free extremity of the intermediate lever 48 and at their upper extremities upon the side portions of a yoke 56, to the central portion of which is secured one extremity of a turnbuckle 57, the opposite extremity of which is pivotally mounted upon a cross pin 58 extending through one extremity of the rocker bar 52. By properly adjusting the turnbuckle 57 any desired tension can be put upon the springs 54. I preferably overbalance the rocker arm 52 so as to maintain an initial tension on the springs 54 of the shock absorbing mechanism and to aid in maintaining the foot treadle and associated parts normally in raised position by securing a relatively stiff spring 59 upon the opposite extremity of the rocker bar 52 from that carrying the cross pin 58 to which the turnbuckle 57 is connected. The lower extremity of the spring 59 is connected to one extremity of a turnbuckle 60, the opposite extremity of which is fixed in an eyebolt 61 secured upon the side wall of the cabinet. By properly adjusting the turnbuckle 60 any desired initial tension may be given to the spring 59 and through it to the rocker bar 52 and shock absorbing mechanism. A link 62 is pivoted at its lower extremity to the cross pin 58 in the rocker bar 52 and at its upper extremity is pivoted upon a cross pin 63 carried by a projecting arm 64 on the rocker cam 65 pivoted on the same stub shaft 40 on which the bell-crank-lever 39 is mounted. The rocker cam 65 is unconnected with the bell-crank-lever 39, though mounted on the same shaft, and provision is made for a rocking movement of the cam 65 independently of the lever 39 to actuate the mechanism for locking the selecting mechanism, as hereinafter described. This independent movement is secured by providing a notch 66 in the upper periphery of the cam 65 and extending a pin $39^a$ from the upper arm of the bell-crank-lever in position to be contacted by the forward wall of the notch 66 whenever the cam 65 is rocked sufficiently to bring such forward wall into engagement with the pin (note Figs. 3 and 12). After the preliminary movement of the rocker cam 65 has been completed to bring the forward wall of the notch 66 into engagement with the pin $39^a$ the continued movement of the cam 65 will rock the bell-crank-lever 39 to elevate the vertically disposed link 37 to actuate the operating lever 35, which as hereinbefore described, pulls upon the operating cord 25 to unwind such cord from the smaller portion of the pulley 22 and so wind the lifting cord 20 upon the larger portion of the pulley 22 to elevate the lifter bar 19. The movement of the foot treadle mechanism to its full extent, when multiplied by the intermediate lever mechanism, is sufficient to rock the operating lever 35 to operate the cords 25 and 20 to completely elevate the lifter bar 19 and through it the desired display sheet. As long as the pressure of the foot remains upon the pedal 41 the lifter bar and display sheet will be maintained in elevated position, but as soon as the foot pressure is removed, the combined pressure exerted by the extended springs 54 and 59 will serve to return the lever mechanism and the lifter bar to their normal positions.

When the lifter bar 19 is first elevated the contact members 17 are brought into engagement with the cross bar 11 then above the notched portions 17ª of the contact members (note Fig. 13), then the further movement of the lifter bar and contact members will elevate that particular cross bar 11 and attached display sheet 10. To obviate the possibility of the sheet being elevated from being shaken out of engagement with the contact members 17 by mischievous or malicious persons operating the foot treadle, I preferably provided retaining members 67 slidably mounted in guide brackets 17ᵇ upon the contact members 17, which retaining members are provided with a notched lower extremity adapted to fit over the ends of the cross bars 11 during the major portion of the lifting and lowering operation. As best illustrated in Figs. 6 and 13, the bottoms of the retaining members 67 are normally spaced from the lower portion 17ª of the contact members 17 while the lifter bar and contact members are in their normal lowermost positions. This separation is effected by means of laterally extending pins 68 on the retaining members 67 engaging over inwardly projecting brackets 69 fixed upon the side walls of the cabinet. By virtue of this arrangement, the ends of the several cross bars 11 may freely pass between the lower portions 17ª of the contact members 17 and the lower portions of the retaining members 67 as long as the lifter bar and contact members are in their normal lowermost positions. Accordingly, the selecting mechanism hereinbefore described may be freely operated without affecting the lifting and lowering mechanism, and any desired display sheet brought into position above the contact members for elevation and display. However, as soon as the contact members 17 have been raised sufficiently to bring the cross bar 11 then in position to be raised into engagement with the notched lower portion of the retaining members 67, the cross bars will be securely locked within the contact members and continued movement will lift the retaining members from the bracket 69 and carry them along with the contact members 17. Accordingly, the display sheet will be supported in the notched lower portion 17ª of the contact members and be engaged by the notched lower portion of the retaining members 67 so that it would be practically impossible to dislocate them by jerking or shaking movements.

The mechanism for locking the selecting mechanism during the lifting and lowering operation will now be described. A locking lever 70 is pivoted at one extremity on the stub shaft 71 extending from the side wall of the cabinet (see Figs. 3 and 12) and carries at its free extremity a ratchet block 72 having one or more teeth 73 depending from its lower surface into position to engage in the toothed wheel 74 fixed upon the same shaft 13 as the pinion 16 of the selecting mechanism whenever the locking lever 70 is swung downwardly. A spring 75 is arranged between the locking lever and a pin 76 fixed upon the side wall of the cabinet to normally maintain the ratchet block 72 of the locking lever out of engagement with the wheel 74, a stop pin 77 being suitably fixed upon the side wall of the cabinet to limit this upward movement. The upper surface of the ratchet block 72 is curved to conform with the curved lower surface of the rocker cam 65, which lower surface is stepped substantially as shown in Figs. 3 and 12 to control the position of the locking lever according to the position of the cam 65. Thus, as shown in Fig. 3, the innermost curved portion of the lower edge of the cam 65 is spaced sufficiently from the toothed wheel 74 that as long as the ratchet block 72 remains in contact with this inner curved portion the wheel 74 is free to turn. An inclined wall 65ª is arranged between this inner curved portion of the cam and the outer curved portion 65ᵇ thereof, and when the cam 65 is rocked, the first movement thereof will cause the inclined surface 65ª to ride upon the inclined surface 72ª of the ratchet block to force the ratchet block and locking lever downwardly into engagement with the toothed wheel 74 and, as shown in Fig. 12, the continued rocking movement of the cam 65 will maintain the outer curved portion 65ᵇ in contact with the upper wall of the ratchet block 72 to hold the locking lever depressed as long as the lifting and lowering mechanism is out of its normal position. The teeth of the wheel 74 are preferably pointed at their extremities so that the ratchet tooth 73 is certain to impinge against one side or the other of some tooth of the wheel 74; and this construction is utilized to insure the correct positioning of the cross bar 11 of the desired display sheet to enter the notched lower portion 17ª of the contact members. By mounting the toothed wheel 74 on the same shaft with the pinions 16 of the selecting mechanism the pinions 16 will be simultaneously moved with the wheel 74 if it is necessary to move this wheel during the seating of the ratchet 73, and if through negligence the selecting mechanism has been improperly set with the desired cross bars 11 slightly out of alignment with the notched portion 17ª of the contact members, the ratchet tooth will impinge against the inclined side of one of the teeth of the wheel 74 and slide down same, in so doing shifting the wheel 74 and attached pinion 16 to correctly align the cross bars 11 over the notches in the contact members.

The lifter bar 19 in its movements is guided upon a display rack comprising an upper bar 78 secured to the top of the cabinet, a lower bar 79 braced by the cross shaft 13 and side bars 80 connecting the upper and lower bars. As best shown in Fig. 4 the side bars 80 are grooved on their inner edges to receive a stiffening plate 81 of sheet steel or the like which is adapted to completely fill the guide frame and provide a cover preventing interior mechanism from showing through the glass panel 7. Upon the front face of this stiffening plate 81 may be arranged directive or advertising indicia as desired, and since this surface is exhibited through the glass 7 at all times except when a display sheet is elevated it will be seen that directions or advertisements thereon will receive more attention than those on any particular display sheet. The bracing of the lower bar 79 from the shaft 13 so that the frame is rigid and yet no obstructions are formed at the sides of the frame that would interfere with the travel of the lifting and lowering mechanism is best shown in Figs. 9 and 14. Sleeves 82 are arranged over the shaft 13 but unconnected thereto and carry arms 83 adapted to fit into notches 84 in the upper edge of the lower bar 79 (note Fig. 9). The arms 83 are also formed with notches 85 on their upper edge adapted to receive the latch members 86 pivoted upon the lower bar 79 in position to enter the notches 85. With this construction the shaft 13 is free to rotate in the sleeves 82 while the lower bar 79 of the guide frame is braced against lateral as well as longitudinal movements, and as above noted the sides of the guide frame are unobstructed. Substantially centrally of the side members 80 of the guide frame is provided a bracing strip 87 secured at its upper and lower extremities to the bars 78 and 79 respectively and adapted to form a guide rail for the central portion of the lifter bar 19. As best illustrated in Fig. 11, spaced lugs 88 are secured to the central portion of the lifter bar 19 in position to engage the opposite sides of the central bar 87 and prevent lateral movement of the lifter bar while it is being elevated or lowered.

The operation of the several mechanisms utilized in my improved display cabinet has been separately described. The desired directory classification, advertisement, etc., is first found upon the index 8, which indicates the number of the display sheet 10 bearing the information desired. The handwheel 9 is then rotated until the desired number is opposite the pointer on the cabinet, which oscillates the supporting segments 12 carrying the series of display sheets 10 so as to bring the desired display sheet directly above the contact members 17 of the lifting and lowering mechanism. The foot pedal 41 is then depressed to first lock the selecting mechanism in position—completing the correct alignment of the display sheet with the contact members if necessary—and then actuate the lifting and lowering mechanism to elevate the desired display sheet into view behind the glass panel 7 of the cabinet. As long as the foot pedal is depressed to its full extent the desired display sheet will be maintained in its raised position, but when the operator's foot is removed from the pedal 41 the combined action of the springs 50, 54 and 59 of the actuating mechanism will serve to raise the foot pedal and lower the display sheet into its original position. At the terminus of such return movement of the actuating mechanism, the locking lever 70 will be released from the toothed wheel 74, whereupon the selecting mechanism is again freed to permit the selection of a new display sheet. The guard strips 14 prevent the accidental dislocation of the display sheets from the serrations of the supporting segments 12, and the retaining members 67 coacting with the notched lower portions of the contact members 17 serve to prevent the accidental dislocation of the particular display sheet being elevated or lowered. Moreover, the locking mechanism prevents the movement of the supporting segments during the operation of the lifting and lowering mechanism and insures that each display sheet will be maintained in its intended position.

While it will be apparent that the illustrated embodiment of my invention herein disclosed is well calculated to adequately fulfill the objects and advantages primarily stated, it is to be understood that the invention is susceptible of variation, modification and change within the spirit and scope of the subjoined claims.

Having described my invention, I claim—

1. A display cabinet having a pair of serrated supporting segments pivotally mounted therein, cross bars normally resting upon the serrated segments, a plurality of display sheets suspended from the cross-bars, means for lifting any one of said sheets from the segments for display and returning it to its original position including a pair of pick-up members, means for rocking the segments to bring the cross bars of the display sheets successively into alignment with the pick-up members including racks on the segments, pinions meshing with the racks, and means arranged exteriorly of the cabinet for rotating the pinions.

2. A display cabinet having a pair of serrated supporting segments pivotally mounted therein, cross bars normally resting upon the serrated segments, a plurality of display sheets suspended from the cross-bars, means for lifting any one of said sheets from the segments for display and returning it to its original position including a pair of pick-up members, means for rocking the segments to bring the cross bars of the display sheets successively into alignment with the pick-up members including racks on the segments, pinions meshing with the racks, and a handwheel arranged exteriorly of the cabinet and connected with the pinions.

3. A display cabinet having a pair of serrated supporting segments pivotally mounted therein, cross bars normally resting upon the serrated segments, a plurality of display sheets suspended from the cross-bars, means for lifting any one of said sheets from the segments for display and returning it to its original position including a pair of pick-up members, means for rocking the segments to bring the cross bars of the display sheets successively into alignment with the pick-up members including racks carried by the segments, pinions meshing with the racks, a shaft to which the pinions are fixed extending through one wall of the cabinet, and a handwheel fixed to the shaft exteriorly of the cabinet.

4. A display cabinet having a pair of serrated supporting segments pivotally mounted therein, cross bars normally resting upon the serrated segments, a plurality of display sheets suspended from the cross-bars, means for lifting any one of said sheets from the segments for display and returning it to its original position including a pair of pick-up members, means for rocking the segments to bring the cross bars of the display sheets successively into alignment with the pick-up members including racks carried by the segments, pinions meshing with the racks, a shaft to which the pinions are fixed extending through one wall of the cabinet, a ratchet wheel also fixed to the shaft, and means for engaging the ratchet wheel to lock the segments against movement while the lifting means is in operation.

5. A display cabinet having a pair of serrated supporting segments pivotally mounted therein, cross bars normally resting upon the serrated segments, a plurality of display sheets suspended from the cross-bars, means for lifting any one of said sheets from the segments for display and returning it to its original position including a pair of pick-up members, means for rocking the segments to bring the cross bars of the display sheets successively into alignment with the pick-up members including racks carried by the segments, pinions meshing with the racks, a shaft to which the pinions are fixed extending through one wall of the cabinet, a ratchet wheel also fixed to the shaft, and a locking lever adapted to engage the ratchet wheel to hold the segments against movement while the lifting means is in operation.

6. A display cabinet having a pair of serrated supporting segments, cross bars normally resting upon the serrated segments with their extremities extending beyond the segments, a plurality of display sheets suspended from the cross-bars, means for rocking the supporting segments, means for lifting any one of the display sheets from the segments into display position and returning it to its original position upon the segment including a pair of pick-up members having notched lower portions normally positioned below the paths of travel of the extremities of the cross bars, a lifter bar carrying the pick-up members, a lifting cord secured at its lower extremity to the lifter bar, a pulley to which the upper end of the lifting cord is connected, a second pulley fixed to the first-mentioned pulley, an operating cord secured to the second pulley and adapted to be wound thereon while the lifting cord is being unwound from the first-mentioned pulley and unwound therefrom while the lifting cord is being wound upon the first-mentioned pulley, and means for winding the operating cord including an operating lever connected to the operating cord, a link pivoted to the operating lever, a foot lever and an intermediate lever mechanism for lifting and lowering said link.

7. In a display cabinet, a plurality of display sheets normally supported out of display position, and means for lifting each of said display sheets into display position and returning it to its original position, comprising a pick-up member adapted to engage any one of the sheets, a lifter bar secured to the pick-up member, a pulley mounted above the lifter member, a lifting cord secured at its lower extremity to the lifter bar and at its upper extremity to the pulley and arranged to wind and unwind upon said pulley, and means for rotating said pulley in opposite directions including an operating cord arranged to wind and unwind upon the pulley in opposite directions to the lifting cord, an operating lever connected to the operating cord, a foot lever and intermediate lever system arranged between the foot lever and the operating lever for swinging the operating lever upon movement of the foot lever, said intermediate lever system including a cam, and means under control of said cam for holding the remaining display sheets stationary while any one of the display sheets is being elevated and lowered.

8. In a display cabinet, a pair of serrated supporting segments, a plurality of display sheets normally supported upon the segments, means for rocking said segments, and means for elevating any one of the display sheets into display position and returning it to its original position including a cam, and means under control of said cam for locking the segments stationary while any sheet is being elevated and lowered.

9. In a display cabinet, a pair of serrated supporting segments, a plurality of display sheets normally supported upon the segments, means for rocking said segments, means for elevating any one of the display sheets into display position and returning it to its original position including a cam, and means under control of said cam for locking the segments stationary while any sheet is being elevated and lowered including a ratchet wheel connected with the segments and a locking lever movable into and out of engagement with the ratchet wheel under control of said cam.

10. In a display cabinet, a pair of serrated supporting segments, a plurality of display sheets normally supported upon the segments, means for rocking said segments, means for elevating any one of the display sheets into display position and returning it to its original position including a cam, and means under control of said cam for locking the segments stationary while any sheet is being elevated and lowered including a ratchet wheel connected with the segments, and a lock lever held in engagement with said cam and moved thereby into and out of engagement with the ratchet wheel.

11. In a display cabinet, a pair of serrated supporting segments, a plurality of display sheets normally supported upon the segments, means for rocking said segments, means for elevating any one of the display sheets into display position and returning it to its original position including a cam, and means under control of said cam for locking the segments stationary while any sheet is being elevated and lowered including a rack on one of the segments, a pinion meshing with the rack, a ratchet wheel movable with the pinion, and a locking lever movable into and out of engagement with the ratchet wheel under control of said cam.

12. In a display cabinet, a pair of serrated supporting segments, a plurality of display sheets normally supported upon the segments, means for rocking said segments, means for elevating any one of the display sheets into display position and returning it to its original position including a cam, and means under control of said cam for locking the segments stationary while any sheet is being elevated and lowered including a rack on one of the segments, a pinion meshing with the rack, a ratchet wheel movable with the pinion, and a locking lever held in engagement with the cam and movable thereby into and out of engagement with the ratchet wheel.

13. In a display cabinet having a transparent panel, a series of display sheets normally supported below the panel, means for shifting the position of said display sheets to bring them successively into position directly below said panel including a rotatable shaft, means for lifting any one of the display sheets into position directly behind said panel for display purposes and returning it to its original position, and means for guiding the selected sheet in its movements including a guide rack in parallel spaced relation behind the transparent panel, said rack being supported at its upper extremity by the cabinet and at its lower extremity by said shaft.

14. In a display cabinet having a transparent panel, a series of display sheets normally supported below the panel, means for shifting the position of said display sheets to bring them successively into position directly below said panel including a rotatable shaft, means for lifting any one of the display sheets into position directly behind said panel for display purposes and returning it to its original position, means for guiding the selected sheet in its movements including a guide rack in parallel spaced relation behind the transparent panel, and means for supporting the lower extremity of said rack upon said shaft comprising sleeves freely mounted over the shaft, notched arms extending from the sleeves into engagement with said rack, and latch members pivoted on the rack and movable into the notches of said arms.

In witness whereof I hereunto set my hand.

WILLIAM J. McKEE.